E. A. JONES.
COLLAPSIBLE RIM FOR WHEELS.
APPLICATION FILED OCT. 3, 1918.
1,364,935.
Patented Jan. 11, 1921.
2 SHEETS—SHEET 1.
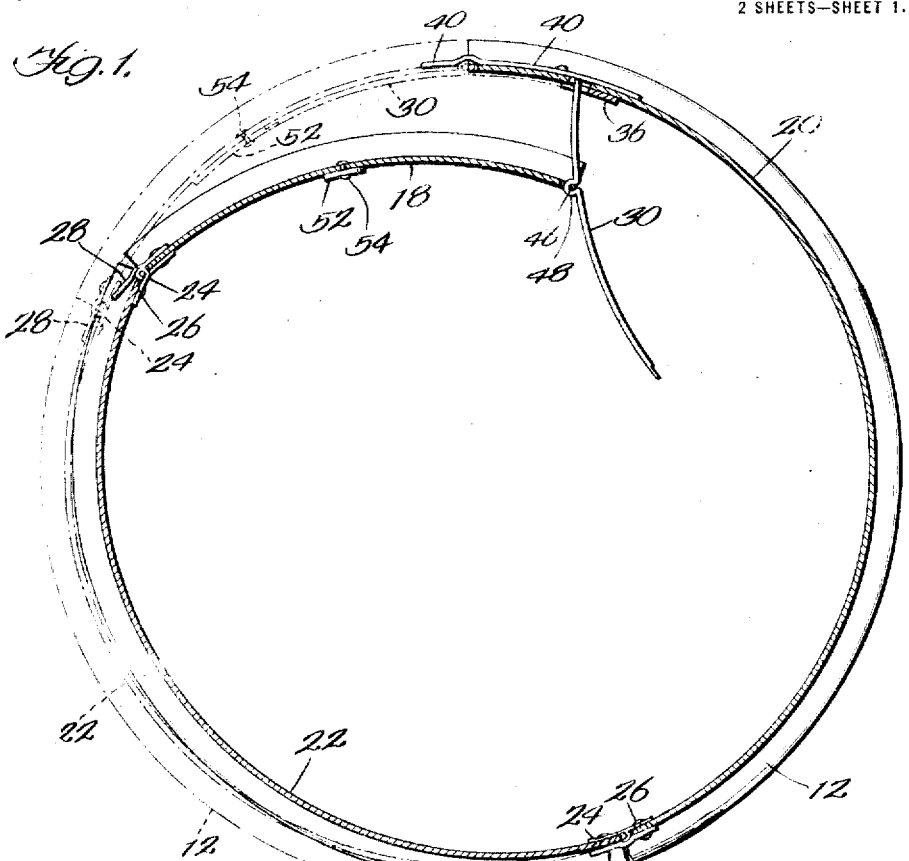
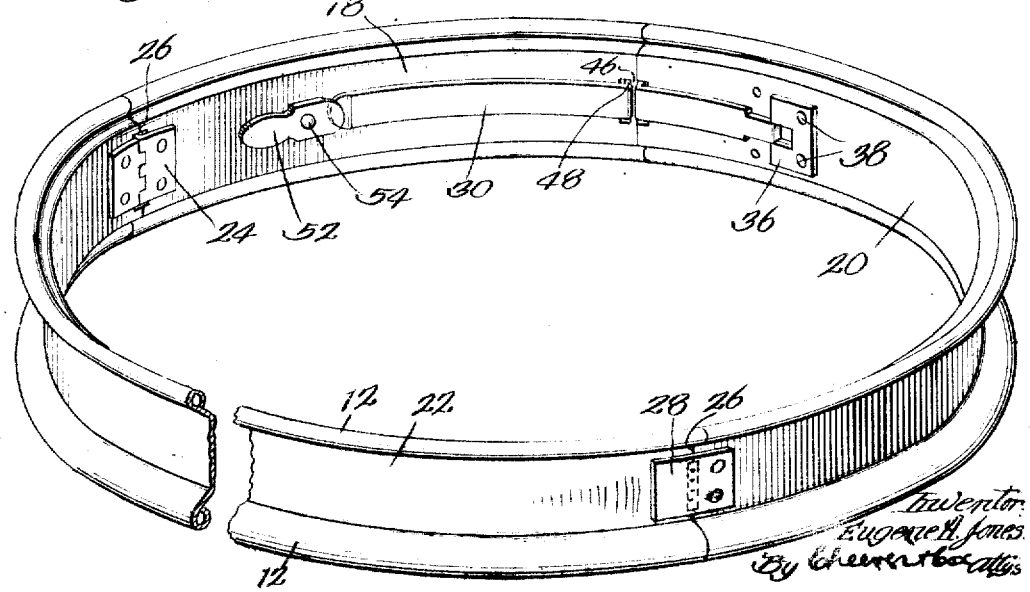

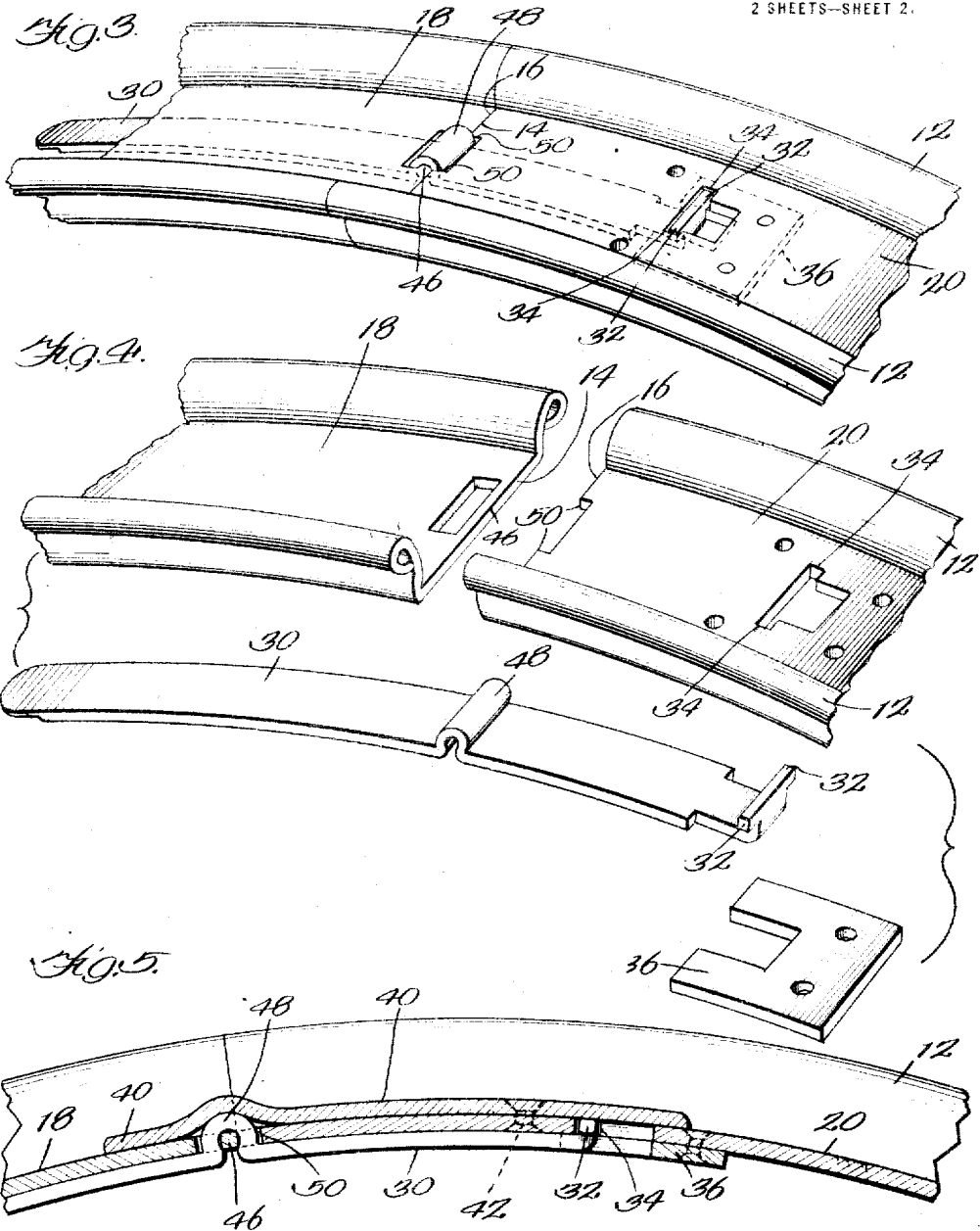

UNITED STATES PATENT OFFICE.

EUGENE A. JONES, OF LOS ANGELES, CALIFORNIA.

COLLAPSIBLE RIM FOR WHEELS 1,364,935.     Specification of Letters Patent.     Patented Jan. 11, 1921.

Application filed October 3, 1918. Serial No. 256,663.

*To all whom it may concern:*

Be it known that I, EUGENE A. JONES, a citizen of the United States, residing at Los Angeles, in the county of Los Angeles and State of California, have invented a certain new and useful Improvement in Collapsible Rims for Wheels, of which the following is a specification.

This invention relates to that class of tire rims or tire supports, commonly known as collapsible or demountable rims which are commonly used to carry previously inflated pneumatic tires so that they can be readily applied to and removed from the wheel proper of a vehicle, such as an automobile, without its being necessary to go through the manipulations of inflating the tire at the roadside or other point at which and when it is necessary to change pneumatic tires.

As is well understood in the art, the pneumatic tire carried by the rim must at some time be put on and removed from the rim itself, and the object of this invention is to provide a collapsible rim of very simple construction, which can be easily and cheaply made, which can be easily and conveniently applied to and removed from the tire, and which is not liable to get out of order when in use. A further object is to provide such a device in which all the tools for manipulating the rim are permanently attached to the rim so that they cannot be lost, as is possible where separate tools are required.

The invention consists in a collapsible device capable of carrying out the foregoing objects, and more particularly one having one or more of the many features and details of construction which will be hereafter more fully set forth in the specification and claims.

Referring to the drawings, in which similar numerals indicate the same parts throughout the several views, Figure 1 is a side view partially in section, of mechanism illustrating this invention in its preferred form.

Fig. 2 is a perspective view of the same mechanism in approximately horizontal position, showing the details of the collapsing mechanism as they appear on the underside of the rim.

Fig. 3 is a perspective view of the collapsing mechanism showing its appearance on the outside of the rim.

Fig. 4 is a perspective view of the parts shown in Fig. 3, separated one from the other.

Fig. 5 is an enlarged sectional detail view taken through the center of the rim, showing the parts illustrated in Fig. 3 with a tire protecting plate added.

In carrying out this invention, a metallic tire supporting rim having the customary side flanges 12 is provided, the same being severed transversely at least at one point so that there are two ends 14 and 16 abutting each other in normal position, shown in Figs. 2 and 3 and the dotted line position of Fig. 1, and passing each other somewhat when the rim is collapsed, as shown in full line position in Fig. 1. If the rim proper is made of very resilient material so that it can be bent circumferentially so that the ends 14 and 16 move from the dotted line to the full line position of Fig. 1, it is unnecessary to sever the rim at any other point, but in ordinary rim practice, rims are not made of such exceedingly resilient material, and the device is, therefore, shown herein as applied to a rim cut in three segments or parts 18, 20 and 22, sections 18 and 22 being hinged together and sections 20 and 22 being hinged together so as to afford a more complete collapsing of the rim when the ends 14 and 16 of sections 18 and 20 respectively, heretofore referred to, are moved from dotted line position of Fig. 1 to the full line position and beyond.

One feature of the invention consists in the hinges 24 applied at the points heretofore indicated, which are, as clearly shown, so arranged that their pivotal bearings 26 are located in recesses within the bodies of the bases of the rim section and are supported by the adjacent edges of the segments of the rim, from which it follows that any thrust or strain transferred from a given section of the rim to the hinge is passed on to the next section and is not taken up in these pivotal connections of the hinges. These hinged pivots being thus placed in the body of the rim also serve as locking blocks in all positions of the hinges to prevent lateral movement of adjacent rim sections with reference to each other as the hinges open under movement of the rim sections.

While in actual practice all three sections 18, 20 and 22 may or do move more or less in collapsing the rim, sections 18 and 20 move most relatively to each other and will, therefore, for convenience, be referred to as the movable sections. These two sections 18 and 20 each have rigidly attached to them at their ends adjacent to the hinges 24, heretofore referred to, cover plates 28 extending over and protecting the adjacent joint between the rim sections attached together by a particular hinge. These cover plates serve two purposes; first, that of protecting the tire tube which is ultimately to be applied to the rim so that it cannot catch or otherwise injuriously engage the space between adjacent rim sections at that point, and second, to act as levers which, when engaged by the inflated tire on the rim, tend to force the adjacent rim sections 18 and 20 toward the normal or dotted line position of Fig. 1 or that of the full line position of Fig. 3. In other words, this plate 28 between rim sections 18 and 22 serves to rotate section 18 in a counter-clockwise direction, as viewed in Fig. 1, while plate 28 between sections 20 and 22 serves to rotate section 20 in a clockwise direction about its hinge pivot 26, this as heretofore explained, under the action of the pressure of air in the pneumatic tire when the tire on the rim is inflated. Of course, this lever action fails to take place when the tire on the rim is deflated.

In order to manipulate the ends 14 and 16 of the movable rim sections in the manner heretofore referred to, a special tool is provided permanently attached to the rim sections so that it cannot become lost. This tool, broadly speaking, consists in nothing more than a lever 30 usually made of flat metal, pivoted at its end to one of the movable rim sections, as for instance section 20 at a substantial distance from the end 16, while the approximate middle of this lever 30 is pivoted to the extreme end 14 of the adjacent movable rim section 18, there being means provided for locking the other end of the lever 30 adjacent to the underside of rim section 18.

Going into details, this lever 30 is provided with a pivotal connection to movable section 20 by forming on the end of the lever a T-shaped pivot member 32 which enters a recess 34 formed for the purpose in the body of the movable section 20. This pivotal member 32 is held in position by a plate 36 secured to the underside of the rim section by any suitable means, such for instance as screws 38 and by a cover plate 40 placed on the outside of the rim section and secured thereto by any suitable means, as for instance by screws or rivets 42. This cover plate is of such a size that, as shown, it extends over the abutting ends 14 and 16 of the movable rim sections 18 and 20 to provide a protection at this point to the tube of the tire tube which is applied to the rim.

The end 14 of section 18 is stamped out at its end so as to form an integral cross-bar 46 which acts as a pivot for the central portion 48 of lever 30 which is passed around this member 46 in some such manner as that shown in the drawing, so that when the operator takes hold of the longer or normally free end of lever 30 and moves it from dotted line to full line position of Fig. 1, he can, in so doing, force end 14 of movable rim section 18 first downward and then to the right, as viewed in Fig. 1, from the dotted line to the full line position. The end 16 of rim section 20 is cut away in notch 50 adapted to receive and engage the bearing bent portion 48 in lever 30 so that when the parts are fitted together, as shown in Fig. 1, this central portion 48 of the lever acts as a locking block or wedge to prevent transverse movement of the adjacent ends 14 and 16 of the rim sections 18 and 20. The pivotal joint thus formed by the parts 46 and 48, heretofore described, is covered and protected by the plate 40, heretofore described.

The longer handle or free end of lever 30 is adapted to be detachably locked against the underside of rim section 18 whenever the parts are in the dotted line position of Fig. 1, by any suitable means, as for instance the button device 52 pivoted at 54.

In the operation of the device, assume that it has been manufactured and put together and that it is desired to apply a tire thereto. The parts are first moved to approximately the full line position of Fig. 1, in which position the rim is collapsed and the proper size tire can be fitted over it. The operator then takes hold of the free end of lever 30 and swings it to the left as viewed in Fig. 1 until all of the parts assume the dotted line position of that figure and the full line position of Figs. 2 and 5. In this position the rim is locked in expanded position, whereupon the operator inflates the tire which is now upon the rim, and it is ready for use. When, for any reason, it is desired to remove the tire, the operations just described are reversed.

Attention is called to the fact that the device is one which can be readily used in converting old continuous rims into collapsible rims, it being only necessary to saw such rims across at the necessary point or points and attach the lever mechanism 30 and the necessary hinges to convert it into a collapsible rim. In fact the tool 30 and the hinges can be sold to garage men and other competent mechanics for conversion of old rims into collapsible rims without sending said rims to a factory at all.

The lever 30 is so located and arranged that the necessary power can be applied to it to move the rim parts as described, against considerable adhesion of the tire, thus tearing the rim out from inside the tire, without the use of ordinary tire tools.

The term "permanently pivoted" is used in the claims not to indicate that the parts of the rim cannot be taken apart, but that the lever is under normal conditions a permanent part of the structure and is not removed and taken away every time the rim is moved from normal to collapsed position and vice versa.

Having thus described my invention what I claim as new and desire to secure by Letters Patent, is:—

1. A demountable rim made by taking a circular substantially unperforated metallic tire rim, severing it transversely in a single plane at one point initially unprovided with pivoting preparations selected at random in its circumference to form two abutting rim ends capable of movement one past the other and applying across the line of severance an operating lever conforming in curvature to that of the rim and normally lying along its inner circumference, this in combination with means permanently pivoting the lever at a point intermediate between its ends to one rim end immediately adjacent to the line of severance and with means permanently pivoting the end of the lever which is adjacent to the other rim end at a point on said rim end remote from the line of severance, portions of the lever about one of said pivots entering a recess formed in the body of the rim to aid in preventing side movement of the rim ends, for the purposes set forth.

2. A demountable rim made by taking a circular substantially unperforated metallic tire rim, severing it transversely in a single plane at one point initially unprovided with pivoting preparations selected at random in its circumference to form two abutting rim ends capable of movement one past the other and applying across the line of severance an operating lever conforming in curvature to that of the rim and normally lying along its inner circumference, this in combination with means permanently pivoting the lever at a point intermediate between its ends to one rim end immediately adjacent to the line of severance and with means permanently pivoting the end of the lever which is adjacent to the other rim end at a point on said rim end remote from the line of severance, portions of the lever about one of said pivots entering a recess formed in the body of the rim to aid in preventing side movement of the rim end, and a latch device for detachably securing the opposite end of the lever to the rim end to which the middle of the lever is pivoted.

3. A demountable rim made by taking a circular substantially unperforated metallic tire rim, severing it transversely in a single plane at one point selected at random in its circumference to form two abutting rim ends capable of movement one past the other and applying across the line of severance an operating lever conforming in curvature to that of the rim and normally lying along its inner circumference, this in combination with means permanently pivoting the lever at a point intermediate between its end to one rim end immediately adjacent to the line of severance, and with means permanently pivoting the end of the lever which is immediately adjacent to the other rim end at a point on said rim end remote from the line of severance, portions of the lever about said last mentioned pivot entering recesses formed in the body of the rim on both sides of the line of severance to aid in preventing side movement of the rim ends, for the purposes set forth.

4. In a device of the class described, a collapsible rim of normally circular form, a section of relatively short but of appreciable length severed from the rim, a hinge between one end of the severed section and the main rim, and a plate upon the end of the severed section overlapping the hinge and the main section adapted to be engaged by the tire which is to be applied to the rim to act as a lever tending to restore and hold the severed section to normal position in which the rim is circular.

5. In a device of the class described, a collapsible rim of normally circular form, divided into three sections, hinges at the points of juncture, between one section and each of two other sections, a lever connection at the point of juncture of said other two sections adapted to move the end of one section past the end of the other, and means for locking said lever in the position which it assumes when said last men ned sections are in such position that the rim is in normal circular position, plates upon said other two sections overlapping the intermediate section to which they are attached, adapted to be engaged by the tire which is to be applied to the rim, and act as levers tending to restore and hold said "other two sections" to normal position in which the rim is circular.

6. In a collapsible rim, two rim sections whose ends abut each other in substantially one plane transverse to the rim and are movable one past the other, a lever pivoted to one of said rim sections immediately adjacent to the point of juncture of the rim sections and pivoted to the other section at a point remote therefrom, a permanent hinge bearing for said first pivotal connection on said lever so constructed that portions of the lever about the pivot fit into recesses formed in the two adjacent ends of said rim sections and thus serve as a block to prevent crosswise movement of the rim sections one to the other, and locking means for, when the rim sections are in alinement, detachably securing the lever in position with reference to the rim so that the parts may act as described, for the purposes set forth.

7. In a collapsible rim, two sections severed one from the other along a single plane transverse to the rim and movable one partly past the other, a lever for so moving the sections hinged to one section so located that the portions of the lever about the pivot member of the hinge are embedded within the main body of both rim sections adjacent to said plane of severance, whereby strain which would otherwise be exerted by either section upon said hinge is transmitted directly to the opposite rim section, for the purposes set forth.

8. In mechanism of the class described, a pair of adjacent abutting rim sections separable one from the other, a bearing member 46 formed transversely of one section at substantially its end, a recess 50 cut in the end of the adjacent section, an operating lever provided with a pivot forming member 48 embracing said pivotal bearing 46 and lying in said recess 50, means pivoting one end of said lever to the rim section in which said recess 50 is formed, and means for detachably securing said lever to the other section, for the purposes set forth.

9. As an article of manufacture, a lever for use in the art described consisting of a single thickness of flat metal, bent near its middle to form three sides of the bearing member 48 and provided at one end with an integral T-shaped pivotal hinge bearing member 32, all arranged as shown and described, for the purposes set forth.

In witness whereof, I have hereunto subscribed my name in the presence of two witnesses.

EUGENE A. JONES.

Witnesses:
  DWIGHT B. CHEEVER,
  M. S. ROSENZWEIG.